(12) United States Patent
Kondo

(10) Patent No.: US 9,779,776 B1
(45) Date of Patent: Oct. 3, 2017

(54) OPTICAL DISK REPRODUCING DEVICE, REPRODUCING CIRCUIT OF THE SAME, AND REPRODUCING METHOD OF OPTICAL DISK

(71) Applicant: ROHM CO., LTD., Ukyo-Ku, Kyoto (JP)

(72) Inventor: Hiroyuki Kondo, Kyoto (JP)

(73) Assignee: ROHM CO., LTD., Ukyo-Ku, Kyoto (JP)

( * ) Notice: Subject to any disclaimer, the term of this patent is extended or adjusted under 35 U.S.C. 154(b) by 0 days.

(21) Appl. No.: 15/451,886

(22) Filed: Mar. 7, 2017

(30) Foreign Application Priority Data

Mar. 9, 2016 (JP) ................ 2016-045876

(51) Int. Cl.
*G11B 20/18* (2006.01)
*G11B 11/00* (2006.01)
*G11B 27/034* (2006.01)
*G11B 7/005* (2006.01)
*G11B 27/10* (2006.01)

(52) U.S. Cl.
CPC ............ *G11B 27/034* (2013.01); *G11B 7/005* (2013.01); *G11B 20/18* (2013.01); *G11B 27/105* (2013.01)

(58) Field of Classification Search
CPC ........ G11B 2220/20; G11B 2220/2537; G11B 19/04; G11B 27/36; G11B 20/1883; G11B 33/08; G11B 7/0045; G11B 27/329; G11B 20/1816
USPC ........... 369/53.1, 53.12, 53.15, 53.18, 53.31, 369/53.32, 53.36, 53.42
See application file for complete search history.

(56) References Cited

U.S. PATENT DOCUMENTS 7,702,993 B2 * 4/2010 Weng ............... G11B 20/10527
369/47.11

FOREIGN PATENT DOCUMENTS

JP H0945017 A 2/1997
JP 2001035097 A 2/2001

* cited by examiner

*Primary Examiner* — Nabil Hindi
(74) *Attorney, Agent, or Firm* — Cantor Colburn LLP

(57) ABSTRACT

The present invention suppresses audio skipping. A frame number acquisition unit 102 acquires a current frame number S11. An audio data acquisition unit 104 acquires an audio data S12 of a current frame. A signal processing unit 110 holds the audio data S12 of the current frame in the sub-buffer 114 when the current frame number S11 is discontinuous with a last normal frame number. The signal processing unit 110 stores the audio data stored in the sub-buffer 114 into the main buffer 112 and sets it as a reproduction object, if the current frame number S11 matches an expected value S14 before audio data of N frames is stored in the sub-buffer 114, where N is a predetermined value.

8 Claims, 5 Drawing Sheets

OPTICAL DISK REPRODUCING DEVICE, REPRODUCING CIRCUIT OF THE SAME, AND REPRODUCING METHOD OF OPTICAL DISK

CROSS REFERENCE TO RELATED APPLICATIONS

The present invention claims priority under 35 U.S.C. §119 to Japanese Application No. 2016-045876, filed Mar. 9, 2016, the entire content of which is incorporated herein by reference.

BACKGROUND

This invention relates to an optical disk reproducing device.

Compact disks are widely used as a medium to accommodate audio data. In a compact disk, grooves called pits are formed, and a pattern of pits and lands represents information.

A reproducing device sequentially reads data for each frame. A frame number is assigned to each frame in order. The reproducing device acquires the frame number included in a sub-code, and it is judged whether or not the frame number has continuously increased in ascending order. When the frame number has continuously increased, the data in the frame is read and the read data is stored in a buffer. When the frame number is discontinuous, the reproducing device returns to the last correctly read frame number and retries the reading. The reproducing device reproduces the data stored in the buffer.

Vibration that occurs during compact disk reproduction causes audio skipping. In addition, scratching on a surface of the compact disk also causes audio skipping

Prior Technical Literature

[Patent Literature 1] JP200135097A
[Patent Literature 2] JP945017A

BRIEF SUMMARY OF THE INVENTION

Problems to be Solved in the Present Invention

FIG. 1A is a diagram showing a state of reproduction when vibration occurs. First, the 10th to 12th frames are read normally (i). Next, due to vibration, a pickup moves to a position corresponding to the 16th frame (ii), and the sub-code of that frame is read (iii). Then, the continuity between the frame number 16 included in the sub-code and the frame number 12 which is read to be normal and right before the frame number 16 is checked. Because the frame numbers 12 and 16 are discontinuous (iv), the reproducing device returns to the 12th frame and retries reading (v). If vibration is settled, the 12th and proceeding frames can be read normally (vi). If the time required for retry (several hundred ms) is shorter than the length of a buffer (for example, several seconds), reproduction can be performed without audio skipping.

FIG. 1B is a diagram showing a state of reproduction when a compact disk is scratched. Suppose scratches are in the 13th and 14th frames. The 10th to 12th frames, free from scratches, can be read normally and stored in a buffer. Since the 13th frame is scratched, the correct frame number cannot be acquired. As a result, the frame number is judged as discontinuous (ii), then the last normally read frame (the 12th frame) is returned, and the reproduction is retried (iii). Even the 13th frame is read again, the correct frame number cannot be acquired and a retry occurs again. Like this, if a frame number cannot be correctly read due to scratches, the retry is repeated. If all the data stored in a buffer eventually has been reproduced, a long period of silence (audio skipping) will occur.

The present invention has been made in view of the above problems. In order to address such problems, one exemplary purpose of one embodiment is to provide a reproducing device suppressing audio skipping.

Technical Means for Solving Problems

One embodiment of the present invention relates to a reproducing method of an optical disk. The reproducing method comprises a main sequence (A) and a subsequence (B). The main sequence (A) includes the following process:

Step (A-1): Acquire a current frame number and judge a current frame as normal if the frame number is continuous with a last frame number judged as normal, and otherwise judge the current frame as abnormal.

Step (A-2): When the current frame is judged as normal in step (A-1), set an audio data of the current frame as a reproduction object, then move to a next frame, and return to step (A-1).

Step (A-3): When the current frame is judged as abnormal in step (A-1), shift to the subsequence.

The subsequence (B) includes the following process:
(B-1) Temporarily hold an audio data of a current frame.
(B-2) Move to next frame and acquire a current frame number.
(B-3) Judge whether or not the current frame number matches an expected value.
(B-4) When the current frame number matches the expected value in step (B-3), set the temporarily held audio data as a reproduction object, move to next frame and return to step (A-1) of the main sequence.
(B-5) When the current frame number does not match the expected value in step (B-3) and a number of repetitions of the subsequence is less than or equal to a predetermined allowable number of times N (N is a natural number), return to step (B-1).
(B-6) When the current frame number does not match the expected value in step (B-3) and a number of repetitions of the subsequence exceeds the allowable number of times N, move to the last frame judged as normal and return to step (A-1) of the main sequence.

According to this embodiment, when the number of continuous frames containing scratches or the like is less than the allowable number of times N, audio data can be reproduced without audio skipping.

A reproducing method of an embodiment can further comprise a step in which, if there is an error in the temporarily held audio data of a frame, the erroneous audio data can be corrected by complementation using an audio data of a frame before and/or after the erroneous frame.

Thus reproduction becomes possible when there is an audio data error in addition to a frame number error due to scratches or the like.

A subsequence (B) can further comprise a step (B-7). When the current frame number is greater than the expected value by 1 in step (B-3), then in step (B-7) the temporarily held audio data is reproduced and an audio data of the missing frame is produced by complementation. Thus, audio skipping can be further suppressed.

Another embodiment of the present invention relates to an optical disk reproducing circuit. The reproducing circuit comprises a frame number acquisition unit for acquiring a current frame number, an audio data acquisition unit for acquiring audio data of the current frame, a signal processing unit for processing the current frame number and audio data, a main buffer, and a sub-buffer. The signal processing unit (i) stores an audio data of a current frame in the main buffer if the current frame number is continuous with a last frame number judged as normal, and otherwise stores an audio data of a current frame in the sub-buffer and moves a pickup to a next frame. In addition, the signal processing unit (ii) moves a pickup to a last frame judged as normal when the number of times an audio data is stored in the sub-buffer exceeds an allowable number of times N. In addition, the signal processing unit (iii) stores the audio data stored in the sub-buffer into the main buffer if a current frame number matches an expected value before the number of times an audio data is stored in the sub-buffer exceeds an allowable number of times N.

According to this embodiment, when the number of continuous frames containing scratches or the like is less than the allowable number of times N, audio data can be reproduced without audio skipping.

A reproducing circuit can further comprise a reproducing unit for reproducing an audio data stored in the main buffer. When there is an error in an audio data of a frame, the reproducing unit can correct the erroneous audio data by complementation using an audio data of a frame before and/or after the erroneous frame.

A reproducing circuit can further comprise a complementing circuit. When there is an error in an audio data of a frame stored in the sub-buffer, the complementing circuit corrects the erroneous audio data by complementation using audio data of a frame before and/or after the erroneous frame and stores the corrected audio data in the main buffer.

A reproducing circuit can further comprise a complementing circuit. When there is an error in an audio data of a frame stored in a main buffer, the complementing circuit corrects the erroneous audio data by complementation using audio data of a frame before and/or after the erroneous frame.

A reproducing circuit can be integrated into one semiconductor substrate. "Integrated" includes cases where all components of a circuit are formed on a semiconductor substrate, and cases where main components of a circuit are integrated. Some resistors, capacitors and the like can be provided outside the semiconductor substrate for adjusting a circuit constant. By integrating a circuit on one chip, the circuit area can be reduced and the characteristics of the circuit elements can be kept consistent.

Another embodiment of the present invention relates to an optical disk reproducing device. An optical disk reproducing device comprises a pickup, a servo mechanism for positioning the pickup, an analog front end circuit for processing an electrical signal from the pickup, and a reproducing circuit for processing a data from the analog front end circuit and controlling the servo mechanism.

It is to be noted that any combination of the above constituent elements and mutual substitution of constituent elements and expressions of the present invention among methods, apparatuses, systems, etc. are also effective as embodiments of the present invention.

Effects of the Present Invention

According to an embodiment of the present invention, audio skipping can be reduced.

DETAILED DESCRIPTION

Figure 1A:
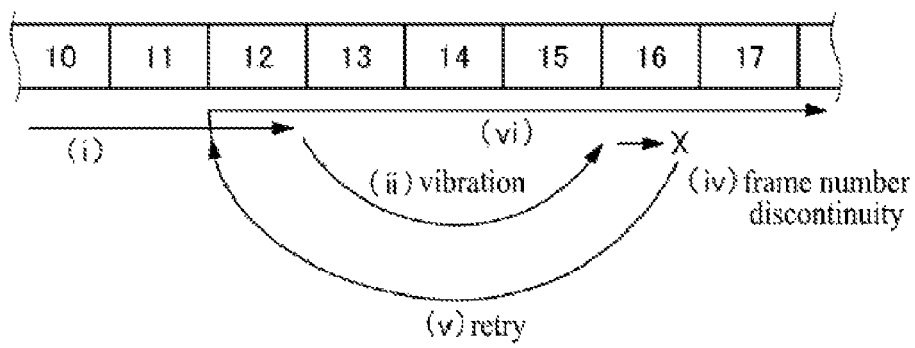
FIG. 1A is a diagram showing a state of reproduction when vibration occurs.
Figure 1B:
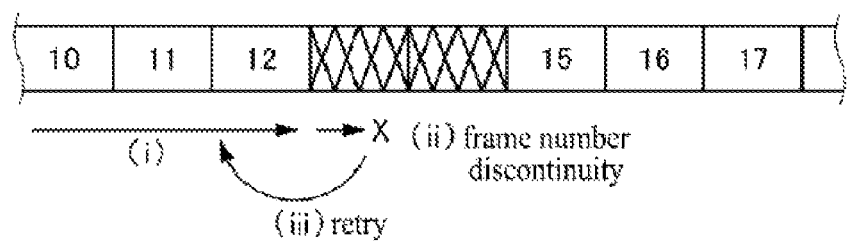
FIG. 1B is a diagram showing a state of reproduction when a compact disk is scratched.

Hereinafter, the present invention will be described with reference to the drawings based on preferred embodiments. Identical or equivalent constituent elements, components, and processes shown in the drawings are denoted by the same reference numerals, and redundant descriptions are omitted as appropriate. In addition, an embodiment is illustrative rather than limiting the invention. All features and combinations described in the embodiments are not necessarily essential to the invention.

Figure 2:
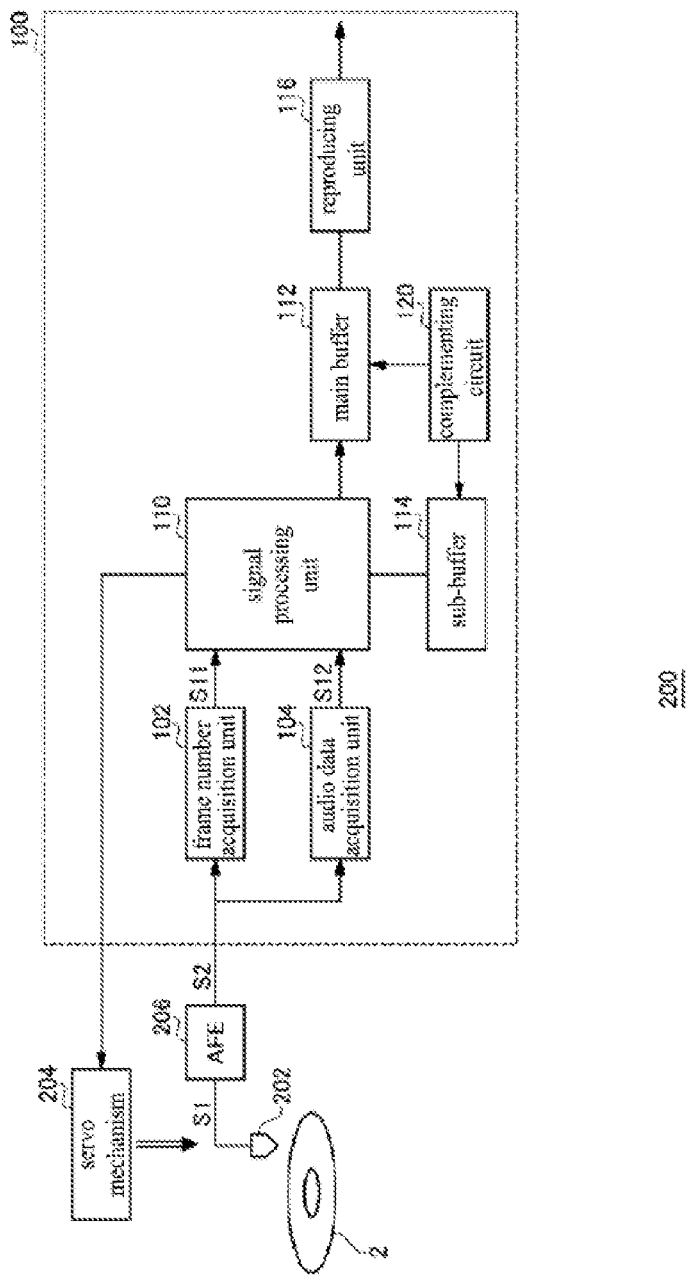
FIG. 2 is a block diagram of an optical disk reproducing device including a reproducing circuit according to an embodiment.

FIG. 2 is a block diagram of an optical disk reproducing device 200 with a reproducing circuit 100 according to an embodiment. The optical disk reproducing device 200 reads and reproduces an audio data recorded on an optical disk (compact disk) 2.

The optical disk reproducing device 200 includes a pickup 202, a servo mechanism 204, an analog front end circuit 206, and a reproducing circuit 100. The pickup 202 irradiates laser light onto a surface of the optical disk 2 and detects the reflected light. The reflected light has a waveform corresponding to a pattern of lands and pits formed on the surface of the optical disk 2. The pickup 202 generates an electrical signal S1 according to the reflected light. The analog front end circuit 206 amplifies the electrical signal S1 generated by the pickup 202 and converts the electrical signal S1 into a I/O digital signal.

The servo mechanism 204 positions the pickup 202. Specifically, the servo mechanism 204 includes a focusing servo for determining the height of the pickup 202, a tracking servo for finely adjusting the radial position of the pickup 202 so as to follow a pit train, and a servo for slowly moving the entire pickup 202 in a circumferential direction.

The reproducing circuit 100 processes a data S2 from the analog front end circuit 206 and controls the servo mechanism 204.

The reproducing circuit 100 includes a frame number acquisition unit 102, an audio data acquisition unit 104, a signal processing unit 110, a main buffer 112, a sub-buffer 114, a reproducing unit 116, and a complementing circuit 120. The reproducing circuit 100 can be a functional IC integrated in one semiconductor substrate.

The frame number acquisition unit 102 refers to a subcode and acquires a current frame number S11. The audio data acquisition unit 104 acquires an audio data S12 of the current frame.

The signal processing unit 110 processes the current frame number S11 acquired by the frame number acquisition unit 102 and the audio data S12 acquired by the audio data acquisition unit 104.

The signal processing unit 110, (i) stores the audio data S12 of the current frame in the main buffer 112 and sets the audio data S12 as a reproduction object when the current frame number S11 is continuous with a last frame number judged as normal (last normal frame number S13). Next, the signal processing unit 110 controls the servo mechanism 204 to move the pickup 202 to a next frame. The reproducing unit 116 reproduces the audio data stored in the main buffer 112. The main buffer 112 may be a FIFO (First In First Out) memory.

In addition, the signal processing unit 110, (ii) controls the servo mechanism 204 to move the pickup 202 to a last normal frame when the number of times an audio data S12 is stored in the sub-buffer 114 (hereinafter, number of repetitions Y of a subsequence) exceeds an allowable number of times N. The allowable number of times N can be about 3 to 20 times. The allowable number of times can be determined according to a number M of frames that the main buffer 112 can store, and it is preferable to set N≤M.

In addition, the signal processing unit 110, (iii) stores the audio data S12 stored in the sub-buffer 114 into the main buffer 112 and sets S12 as a reproduction object if a current frame number S11 matches an expected value S14 before Y (number of repetitions) exceeds an allowable number of times N. Number of repetitions Y is the number of times an audio data S12 is stored in the sub-buffer S114. The expected value S14 of frame number S11 is a value obtained by incrementing by 1 for each movement of frame with reference to the last normal frame number S13.

The main buffer 112 and the sub-buffer 114 may be physically independent memories or different spaces of one memory.

When there is an error in an audio data of a frame stored in the main buffer 112, the complementing circuit 120 can correct the erroneous audio data by complementation using audio data of a frame before and/or after the erroneous frame.

Alternatively, or in addition thereto, when there is an error in an audio data of a frame stored in the sub-buffer 114, the complementing circuit 120 can correct the erroneous audio data by complementation using audio data of a frame before and/or after the erroneous frame, and stores the corrected audio data in the main buffer 112.

Figure 3:
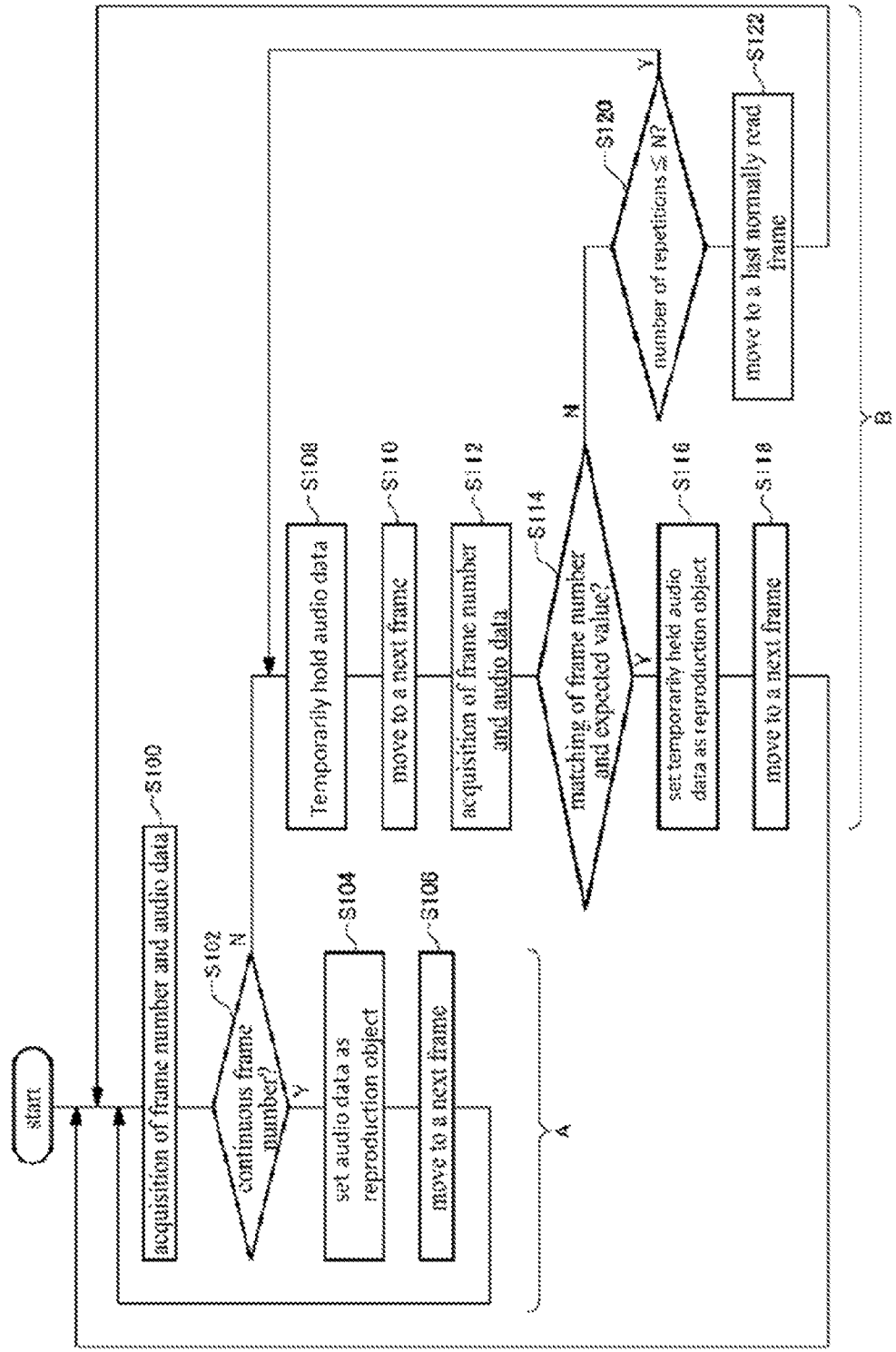
FIG. 3 is a flowchart showing the operation of the optical disk reproducing device of FIG. 2.

The above description explains the configuration of the reproducing circuit 100 and the optical disk reproducing device 200. Next, the operation will be explained. FIG. 3 is a flowchart showing the operation of the optical disk reproducing device 200 of FIG. 2.

This flowchart can be divided into main sequence A and subsequence B. First, main sequence A will be explained. The main sequence A includes steps S100, S102, S104, and S106.

In step S100, a current frame number is acquired. At the same time, an audio data of the frame can be obtained. Next, it is determined whether or not the frame number is continuous with the last frame number judged as normal. If it is continuous, the current frame is judged as normal, otherwise the current frame is judged as abnormal (S102).

As a result of step S102, when the current frame is normal (Y in S102), the audio data of the current frame is set as a reproduction object (S104), and the process moves to a next frame (S106). Next, the process returns to step S100.

In the situation where no abnormality such as a scratch is found in the optical disk 2 and jumping of the pickup 202 due to vibration or other causes does not occur, the main sequence A is repeated.

Next, subsequence B will be explained. As a result of step S102 of the main sequence A, when the current frame is abnormal, the flow moves to subsequence B (N of S102).

In subsequence (B), the audio data of the current frame is temporarily held (S108). Next, the process moves to a next frame (S110) and acquires the current frame number (and audio data) (S112). Then whether or not the current frame number matches an expected value (S114) is judged.

When the current frame number matches the expected value (Y in S114), the audio data temporarily held is set as a reproduction object (S116). The process then moves to a next frame (S118) and returns to step S100 of the main sequence A.

In step S114, if the current frame number does not match the expected value (N in S114) and the number of repetitions Y of subsequence B is less than or equal to a predetermined allowable number of times N (N is a natural number) (Y in S120), the flow returns to the beginning step S108 of subsequence B and repeats the subsequence. At this time, the number of repetitions Y is incremented.

In step S114, when the current frame number does not match the expected value (N of S114) and the number of repetitions Y of subsequence B exceeds an allowable number of times N (N of S120), the process moves to the last frame judged as normal (S122) and returns to step S100 of the main sequence A.

It should be noted that the flowchart of FIG. 3 does not limit the order of processing. Several processes can be carried out interchangeably as long as they do not fail, and they are also included in the scope of the present invention.

Figure 4:
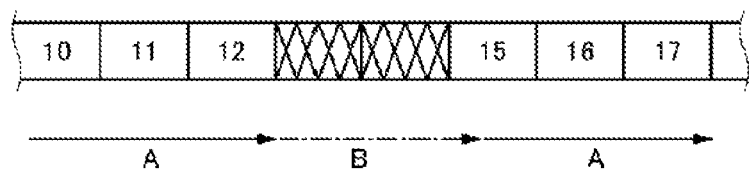
FIG. 4 is a diagram showing a state of reproduction when a compact disk is scratched.
Figure 5:
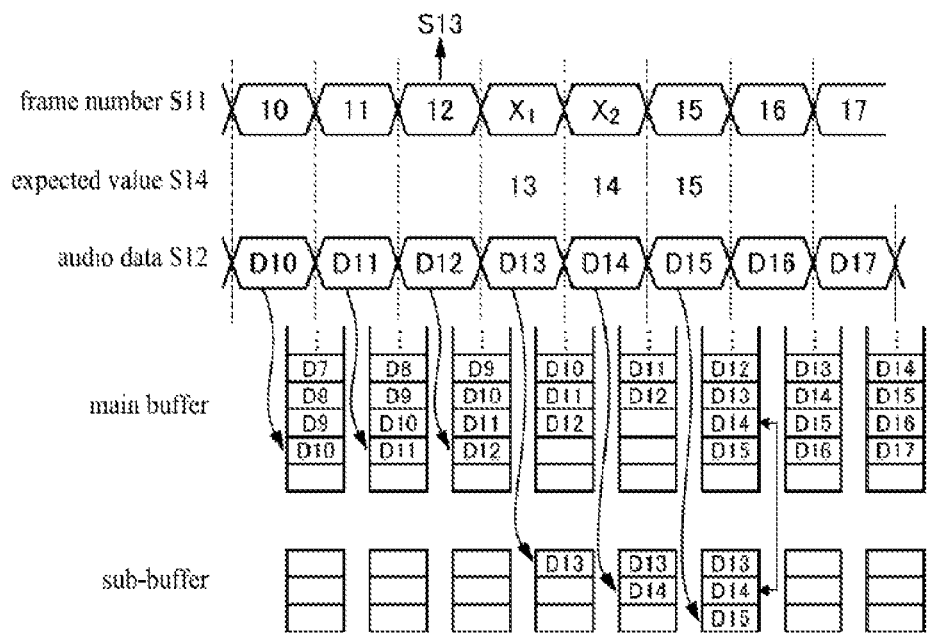
FIG. 5 is a time chart corresponding to FIG. 4.

FIG. 4 is a diagram showing a state of reproduction when a compact disk is scratched. FIG. 5 is a time chart corresponding to FIG. 4. Now suppose that there are scratches in the 13th and 14th frames. The 10th to 12th frames, free from scratches, can be read normally by the main sequence A in FIG. 3. Audio data D10, D11 and D12 of the 10th to 12th frames are sequentially stored in the main buffer 112. Here, an allowable number N is set to 3. The data of the main buffer 112 is postponed when a head data is reproduced.

The 13th frame has scratches, and the acquired frame number X1 (≠13) is discontinuous with the previous frame number 12. As a result, the flow moves to subsequence B. An audio data D13 of the 13th frame is stored in the sub-buffer 114 and temporarily held. The value of last normal frame number S13 is set to 12.

Next, the 14th frame is read. For the 14th frame, the acquired frame number X2 (≠14) does not match a value 14 of the expected value S14. Therefore, an audio data D14 of the 14th frame is stored in the sub-buffer 114 and temporarily held. The value of last normal frame number S13 remains at 12.

Next, the 15th frame is read. In the 15th frame, since there is no scratch, a correct frame number 15 is acquired. This frame number 15 matches a value 15 of the expected value S14. Therefore, the data of the 13th to 15th frames is copied from the sub-buffer 114 to the main buffer 112. After the 16th frame, the flow returns to the main sequence.

As described above, with the reproducing circuit 100 according to the embodiment, when the number of continuous frames containing scratches or the like is less than an allowable number of times N, audio data can be reproduced without causing audio skipping.

Figure 6:
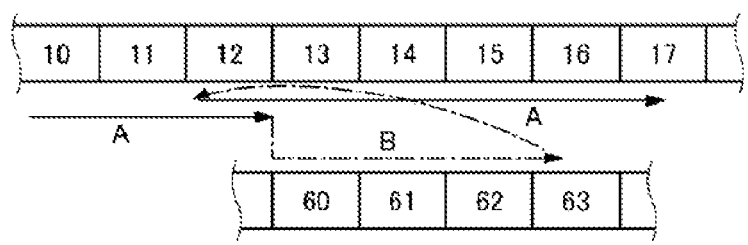
FIG. 6 is a diagram showing a state of reproduction when a pickup jumps due to vibration.
Figure 7:
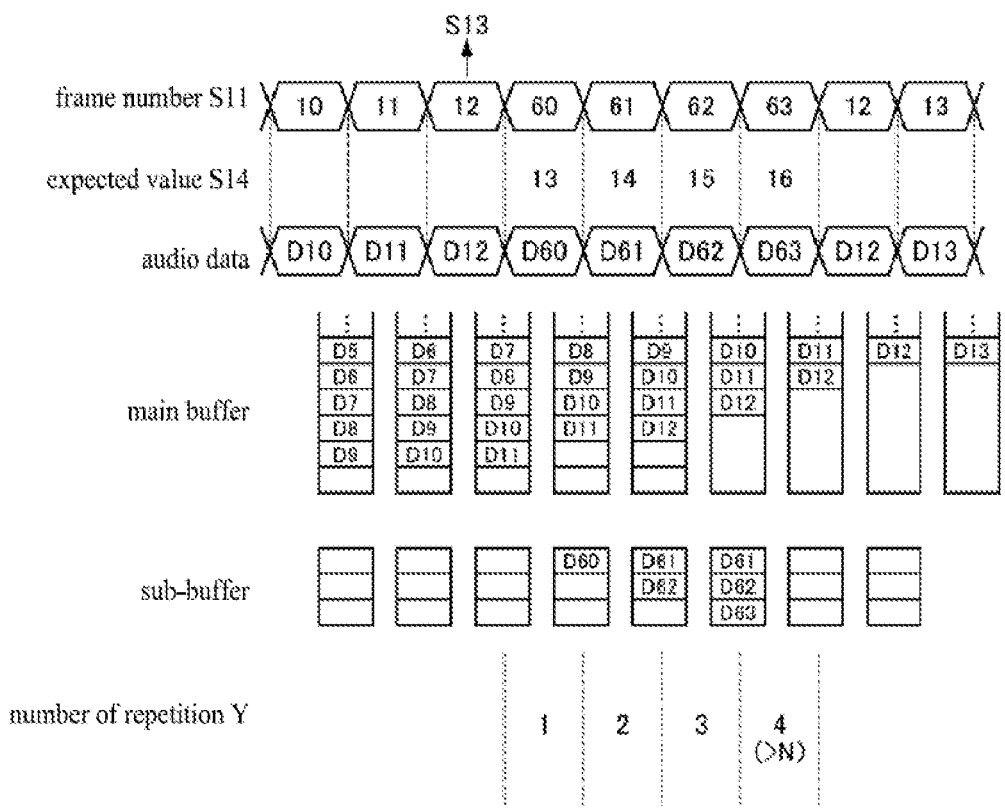
FIG. 7 is a time chart corresponding to FIG. 6.

FIG. 6 is a diagram showing a state of reproduction when a pickup jumps due to vibration. FIG. 7 is a time chart corresponding to FIG. 6. The example shows a case of jumping to the 60th frame after normal reading of the 12th frame.

A frame number 60 acquired with respect to the 60th frame is discontinuous with the previous frame number 12. As a result, the process shifts to subsequence B. An audio data D60 of the 60th frame is stored in the sub-buffer 114 and temporarily held. The value of last normal frame number S13 is set to 12. The number of repetitions Y of the subsequence is 1.

Next, the 61st frame is read. For the 61st frame, an acquired frame number 61 does not match a value 14 of the expected value S14. Therefore, an audio data D61 of the 61st frame is stored in the sub-buffer 114 and temporarily held. The value of last normal frame number S13 remains at 12. The number of repetitions Y of the subsequence is incremented to 2.

Next, the 62nd frame is read. For the 62nd frame, an acquired frame number 62 does not match a value 15 of the expected value S14. Therefore, an audio data D62 of the 62nd frame is stored in the sub-buffer 114 and temporarily held. The number of repetitions Y of the subsequence is incremented to 3.

Next, the 63rd frame is read. For the 63rd frame, an acquired frame number 63 does not match a value 16 of the expected value S14. Since the number of repetitions Y exceeds an allowable number of times N (=3), the data of sub-buffer 114 is discarded. The process then moves to the 12th frame, which was read normally last time, and the main sequence restarts.

In this way, when the position of the pickup moves due to vibration or the like, reproduction from the last normal frame can be resumed as normal.

In the above, the present invention was explained based on an embodiment. It should be understood by those skilled in the art that this embodiment is illustrative and that various modifications can be made to combinations of the constituent elements and the respective processes, and that such variations are also within the scope of the present invention. Hereinafter, such variations will be described.

(Variation 1) In the flowchart of FIG. 3 according to an embodiment, matching of a frame number and an expected value is taken as a condition to return from the subsequence to the main sequence. The main sequence can also be returned if a current frame number differs by 1 from an expected value. If a current frame number is 1 less than an expected value, then the audio data for one frame is insufficient. In such case, audio data of the missing frame can be generated by complementing processing using frames before and/or after the missing frame, and the generated audio data is then stored in the main buffer 112.

(Variation 2) In an embodiment, although a compact disk is provided as an example, the present invention is not limited to compact disk processing. The present invention can be applied to reproducing devices of various optical disks which perform reading in units of similar frames or sectors.

Based on embodiments, the present invention has been described using concrete terms, but embodiments only show the principle and application of the present invention. Many variations and arrangements are permitted in the embodiments without departing from the concept of the present invention as defined in the claims.

What is claimed is:

1. A reproducing method of an optical disk, comprising:
a main sequence (A); and
a subsequence (B);
wherein the main sequence (A) includes:
a step (A-1) that acquires a current frame number and judges a current frame as normal if the frame number is continuous with a last frame number judged as normal, and otherwise judges the current frame as abnormal;
a step (A-2) in which, moving to a next frame and returning to the step (A-1) when the current frame is judged as normal in the step (A-1), and an audio data of the current frame is set as a reproduction object; and
a step (A-3) in which, shifting to the subsequence when the current frame is judged as abnormal in the step (A-1);
the subsequence (B) including:
a step (B-1) that temporarily holds audio data of current frame;
a step (B-2) that moves to next frame and acquires current frame number;
a step (B-3) that judges whether or not current frame number matches an expected value;
a step (B-4) in which, moving to next frame and returning to the step (A-1) of the main sequence when current frame number matches the expected value in the step (B-3), and the temporarily held audio data is set as reproduction object;
a step (B-5) in which, returning to the step (B-1) when current frame number does not match the expected value in the step (B-3) and a number of repetitions of the subsequence is equal to or less than a predetermined allowable number of times N (N is a natural number); and
a step (B-6) in which, moving to last frame judged as normal and returning to the step (A-1) of the main sequence when current frame number does not match the expected value in the step (B-3) and number of repetitions of the subsequence exceeds the allowable number of times N.

2. The reproducing method of claim 1, further comprising a step in which, when there is an error in temporarily held audio data of a frame, the erroneous audio data is corrected by complementation using audio data of a frame before and/or after the frame with the erroneous audio data.

3. The reproducing method of claim 1, further comprising a step (B-7) in which, when current frame number is greater than the expected value by 1 in the step (B-3), audio data temporarily held is reproduced and an audio data of a missing frame is produced by complementation.

4. An optical disk reproducing circuit, comprising:
a frame number acquisition unit for acquiring a current frame number;
an audio data acquisition unit for acquiring an audio data of a current frame;
a signal processing unit for processing current frame number and audio data;
a main buffer; and
a sub-buffer;
wherein the signal processing unit:
(i) stores audio data of current frame in the main buffer when current frame number is continuous with a last frame number judged as normal, and, when current frame number is discontinuous with last frame number judged as normal, stores audio data of current frame in the sub-buffer and moves a pickup to a next frame;

(ii) moves the pickup to last frame judged as normal when the number of times audio data is stored in the sub-buffer exceeds an allowable number of times N; and (iii) stores the audio data stored in the sub-buffer in the main buffer if current frame number matches an expected value before the number of times audio data is stored in the sub-buffer exceeds the allowable number of times N.

5. The reproducing circuit of claim 4, further comprising a complementing circuit that, when there is an error in audio data of a frame stored in the sub-buffer, corrects the erroneous audio data by complementation using audio data of a frame before and/or after the frame with the erroneous audio data, and stores the corrected data in the main buffer.

6. The reproducing circuit of claim 4, further comprising a complementing circuit that, when there is an error in audio data of a frame stored in the main buffer, corrects the erroneous audio data by complementation using audio data of a frame before and/or after the frame with the erroneous audio data.

7. The reproducing circuit of claim 4, wherein the reproducing circuit is integrated into one semiconductor substrate.

8. An optical disk reproducing device, comprising:
a pickup;
a servo mechanism for positioning the pickup;
an analog front end circuit for processing an electrical signal from the pickup;
the reproducing circuit of claim 4, for processing a data from the analog front end circuit and controlling the servo mechanism.

\* \* \* \* \*